Oct. 28, 1958 J. N. H. TAIT 2,857,991
BRAKES FOR ROTARY MOTION
Filed Jan. 12, 1956 2 Sheets-Sheet 1
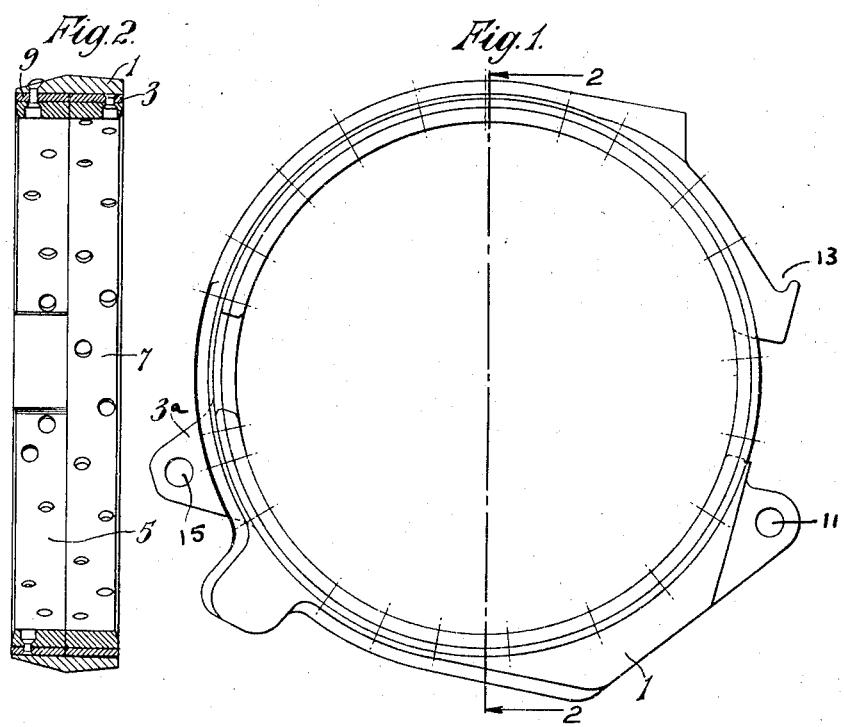
INVENTOR
John N. H. Tait
ATTORNEYS

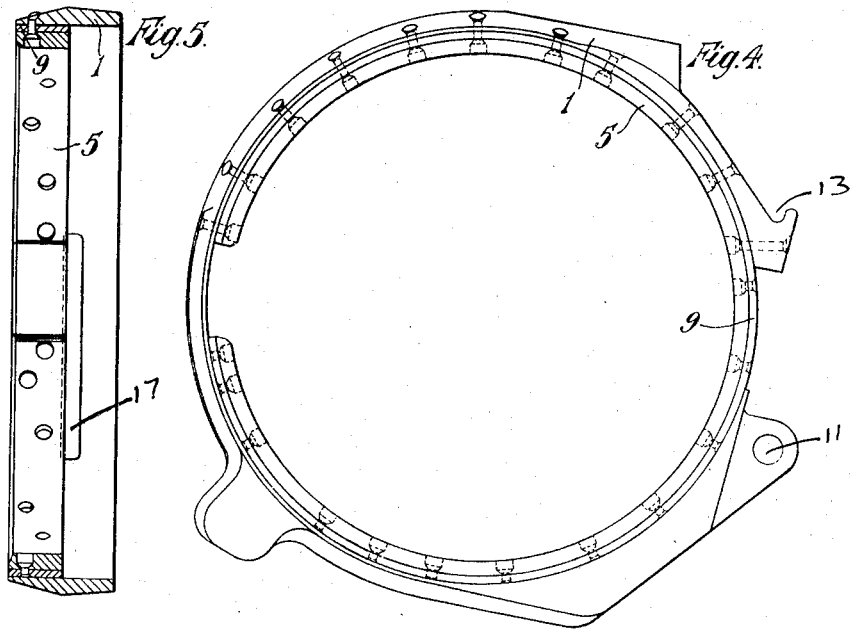
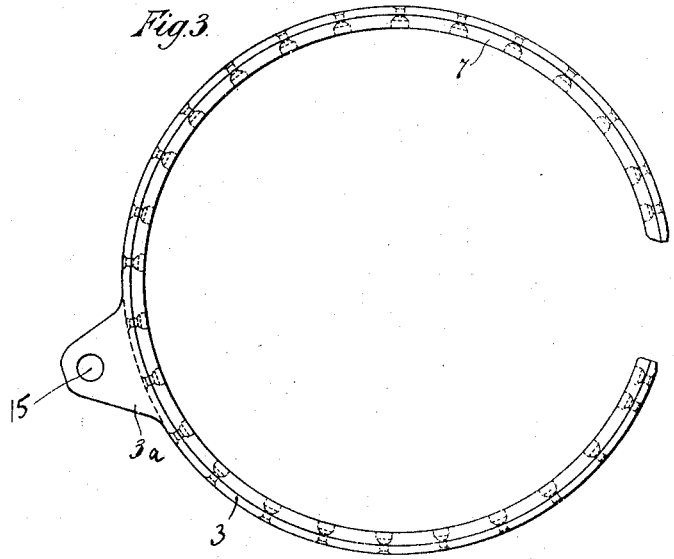

United States Patent Office 2,857,991
Patented Oct. 28, 1958

2,857,991

BRAKES FOR ROTARY MOTION

John Noel Hutton Tait, Coventry, England, assignor to The Birmingham Small Arms Company Limited, Birmingham, England, a British company Application January 12, 1956, Serial No. 558,791

1 Claim. (Cl. 188—259)

This invention relates to brakes for controlling rotary motion, and refers more particularly to braking mechanism for epicyclic change-speed gears of the kind in which a flexible hand brake mechanism is used in conjunction with the reaction drums of an epicyclic driving gear, such flexible brake comprising a primary brake band within which is arranged a secondary brake band having an anchorage independent of that of the primary band, the two together adapting themselves by relative motion to produce a substantially equalised braking effect and being applied from a single actuating member. An example of braking mechanism for epicyclic change speed gears of the kind referred to is described in patent specification No. 220,021.

A braking system of the kind referred to is known as a wrapping brake by reason of the fact that the braking action is obtained by a winding or a wrapping of both the primary and secondary bands on the brake drum in the direction of rotation of the latter, and such arrangement gives a balanced brake having adequate holding power when the engine is driving the vehicle.

When, however, the vehicle is driving the engine, as on a down grade on over-run, the brake drum torque reaction is reversed, so that the brake bands have an unwrapping action and their holding power is only about half that available when wrapping. Obviously a greater braking power could be achieved by increasing the load with which the brakes are applied, but this would necessitate a correspondingly heavier manual pressure to disengage the brakes, and it is desirable that an increased load and manual pressure should be avoided.

It is an object of this invention to provide an improved construction and arrangement of brake of the kind referred to which has a substantially equal braking power in both directions of torque application, has a balanced reaction and requires no increase in the load necessary to apply the brake.

The invention consists in a flexible band brake system of the kind referred to having a primary brake band element superimposed upon two or more secondary brake band elements wherein linings associated with the secondary brake band elements are disposed substantially equally in relation to the reaction points of said elements, the linings being so fixed to the elements that gaps between adjacent ends are disposed at positions substantially diametrically opposite to anchorage points of the respective brake band elements.

In conventional arrangements of braking mechanism of the type specified, a brake band forming a secondary brake element extends around the brake drum and has superimposed upon it another brake band forming the primary brake element which is so arranged as to contact across half its width with the brake drum, thus constituting a direct brake. At substantially diametrically opposite positions, one end of the primary and secondary brake bands is anchored to a fixed casing containing the mechanism, the other end of each band being left free, while associated with the anchorage for the primary band is a reaction member for a toggle lever system by which the brake is applied upon release of a foot-operated pedal. Each band has its own brake lining the ends of which are relatively near to one another, the arrangement being that the respective ends of one band are displaced substantially 180° to those of the other band, on opposite sides of the centre of the drum, with the gap between the ends of each lining adjacent to the anchorages for the primary and secondary bands.

According to a feature of the present invention the lining of a secondary brake band is so disposed that the gap between the ends thereof lies diametrically opposite to the anchorage for this band instead of adjacent to it, while the corresponding gap in the lining of a further secondary brake band is arranged to lie diametrically opposite to the member of the toggle lever system which takes the reaction of the further secondary band. In such arrangement, contraction of a primary band applies both linings to the brake drum in a similar manner to that of conventional arrangements as previously described, but as a result of the modified location of the linings, about half of each lining wraps and unwraps, irrespective of the direction of torque application, thereby giving similar brake-holding power in either direction with a balanced reaction.

In carrying the invention into effect, the disposition of the gap in the lining of one secondary brake band relative to its reaction member may be effected by rivetting the lining to its brake band, the top half of which is secured to the primary band by the same rivets which attach the lining to the secondary band.

In epicyclic change-speed gearing of the "Wilson" type, it is normal practice to incorporate in the brake drum V-shaped circumferential grooves for the purpose of increasing the friction hold of the brake lining by a wedging action which is proportional to the angle between the opposed sides of the grooves.

In conjunction with the improved form of brake according to this invention, it is proposed to incorporate a grooved brake drum as aforesaid, but owing to the reduced wrapping action of the brake linings, a compensation of the friction hold is desirable.

According therefore to a further feature of the invention such compensation of the friction hold of the brake lining is effetced by reducing the angle between the sides of the brake drum grooves.

It has been found that a reduction in the angle between the sides of the grooves from 90° to 55° is sufficient for this compensation, and results in a brake which requires no more applied load to hold a given driving torque reaction than a normal brake, and therefore no increase in the pedal effort for disengaging the brake. Moreover, under the over-run conditions a substantially equal reversed torque can also be held, which is the region of twice the torque which a normal brake would hold on over-run.

One preferred embodiment of the present invention will now be particularly described, with reference to the accompanying drawings, in which:

Figure 1 is a side elevation of a construction of a braking system of the kind referred to.

Figure 2 is a sectional view of the same construction taken on the line 2—2 in Figure 1.

Figure 3 is a side elevation of one secondary brake element of the same construction as in Figure 1.

Figure 4 is a side elevation as in Figure 1, with the secondary brake element of Figure 3 removed.

Figure 5 is a vertical section taken centrally through the construction as illustrated in Figure 4.

A primary brake band 1 is anchored at 11, and is provided with a projection 13 for attachment of an operating lever (not shown).

Within the brake band 1 are two secondary brake bands 3 and 9, each provided with a frictional lining 5, 7, each lining being secured by rivets to its brake band and arranged to operate on a brake drum (not shown) which is provided with circumferential grooves of about 55° angle between the sides of each groove. The secondary brake band 9 is secured at one end to primary brake band 1 in such manner that the gap between the ends of the band 9 is diametrically opposite to the gap between the ends of the brake band 1.

The secondary brake band 3 is disposed within the band 1, side by side with the band 9 and is arranged so that the gap between its ends is diametrically opposite to the gap between the ends of the band 9, its anchorage point 15 being opposite to the anchorage point 11 the band 1 being provided with a slot 17 for the lug 3a of the band 3 to project through.

As shown in Figure 3, the secondary brake band which is disposed within the primary brake band 1 is shown complete with an eyepiece 15 secured thereto for anchoring it at a fixed point in the gearbox by any conventional means. The brake band 9 is riveted at its upper half to the primary braking band 1, thereby forming a part of the primary band 1, as shown in Figure 5. The hooked end 13 and anchor 11 of the primary brake band are connected by an actuating toggle as conventionally used in band brakes of this type.

The construction is arranged within a fixed casing, and in use, a toggle lever system is applied to projection 13 to apply the braking system to the brake drum.

By virtue of the arrangement of brake bands, the frictional hold applied by the brake will be approximately equal in either direction of torque or rotation, since in any circumstance, approximately half of the length of each brake element will tend to wrap on, and half to unwrap.

What I claim is:

A flexible brake band system for controlling rotary motion of a brake drum comprising a primary brake band element having a gap between its ends and anchoring means adjacent thereto at one side of its center, and means for applying substantially equal braking force in opposite direction with rotation of the drum comprising two secondary brake elements on which said primary element is superimposed and having gaps between their ends, one of said secondary elements being secured at one end to the primary element at such position that the gap between the ends of said secondary element is substantailly diametrically opposite to the gap between the ends of the primary element and the other end of said secondary element is free, and the other secondary element having free ends and the gap between them disposed substantially coincident with the gap between the ends of the primary element and having anchorage means at a point substantially diametrically opposite to the anchoring point of the primary element.

References Cited in the file of this patent
UNITED STATES PATENTS

| | | |
|---|---|---|
| 774,448 | Norris | Nov. 8, 1904 |
| 1,714,833 | Wilson | May 28, 1929 |
| 2,005,284 | Wilson | June 18, 1935 |
| 2,536,856 | Roeder et al. | Jan. 2, 1951 |
| 2,542,171 | Wilson et al. | Feb. 20, 1951 |